United States Patent
Li et al.

(10) Patent No.: US 9,058,262 B2
(45) Date of Patent: *Jun. 16, 2015

(54) SENDING NETWORK REJECT/ERROR CODES FROM A TERMINAL ADAPTOR TO TERMINAL EQUIPMENT THROUGH AN AT COMMAND INTERFACE

(71) Applicant: AT&T Mobility II LLC, Atlanta, GA (US)

(72) Inventors: Yunpeng Li, Austin, TX (US); Inderpreet Singh Ahluwalia, Austin, TX (US)

(73) Assignee: AT&T MOBILITY II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/449,887

(22) Filed: Aug. 1, 2014

(65) Prior Publication Data

US 2014/0344634 A1 Nov. 20, 2014

Related U.S. Application Data

(63) Continuation of application No. 13/156,951, filed on Jun. 9, 2011, now Pat. No. 8,819,499.

(51) Int. Cl.
*G06F 11/07* (2006.01)
*H04L 12/24* (2006.01)
*H04W 74/00* (2009.01)

(52) U.S. Cl.
CPC ........ *G06F 11/0775* (2013.01); *H04L 41/0686* (2013.01); *H04W 74/00* (2013.01); *G06F 11/0709* (2013.01)

(58) Field of Classification Search
CPC .................................................. G06F 11/0766
USPC .............................. 714/4.1, 48, 57
See application file for complete search history.

(56) References Cited

U.S. PATENT DOCUMENTS

| | | | |
|---|---|---|---|
| 7,599,359 B1 * | 10/2009 | Croak et al. | 370/356 |
| 7,873,726 B2 * | 1/2011 | Ofir et al. | 709/224 |
| 2006/0058031 A1 * | 3/2006 | Nemoto | 455/436 |
| 2008/0144075 A1 * | 6/2008 | Love | 358/1.15 |

(Continued)

OTHER PUBLICATIONS

"Mobile Radio Interface Layer 3 Specification; Core Network Protocols; Stage 3" (Release 10), 3rd Generation Partnership Project; Technical Specification Group Core Network and Terminals; 3GPP TS 24.008 v10.1.0 (Dec. 2010), 625 pages.

(Continued)

*Primary Examiner* — Chae Ko
(74) *Attorney, Agent, or Firm* — Abel Law Group, LLP (57) ABSTRACT

Error information is sent from a terminal adaptor that accesses a wireless network to terminal equipment coupled to access the wireless network through the terminal adaptor. The error information is sent in response to existence of any one of a plurality of errors conditions with respect to access to the wireless network. The error information includes an error type identifying a domain associated with a source of the error condition being reported and an error code providing a reject error cause for the error condition. One of the error conditions may include an unsolicited error received by the terminal adaptor from the wireless network or when a request by the TA is ignored by the wireless network.

13 Claims, 10 Drawing Sheets

(56) References Cited

U.S. PATENT DOCUMENTS

| | | | |
|---|---|---|---|
| 2008/0285544 A1* | 11/2008 | Qiu et al. | 370/352 |
| 2009/0059848 A1* | 3/2009 | Khetawat et al. | 370/328 |
| 2009/0113074 A1* | 4/2009 | Statia et al. | 709/245 |
| 2009/0213791 A1* | 8/2009 | Prakash | 370/328 |
| 2009/0265543 A1* | 10/2009 | Khetawat et al. | 713/151 |
| 2010/0064289 A1* | 3/2010 | Oe et al. | 718/102 |
| 2011/0200022 A1* | 8/2011 | Annamalai | 370/338 |
| 2012/0082095 A1* | 4/2012 | Sun | 370/328 |
| 2012/0171985 A1* | 7/2012 | Tiwari | 455/404.1 |

OTHER PUBLICATIONS

"AT Command Set for User Equipment (UE)" (Release 10), 3rd Generation Partnership Project; Technical Specification Group Core Network and Terminals; 3GPP TS 27.007 v10.2.0 (Dec. 2010), 243 pages.

"Non-Access-Stratum (NAS) Protocol for Evolved Packet System (EPS); Stage 3," (Release 10), 3rd Generation Partnership Project; Technical Specification Group Core Network and Terminals; 3GPP TS 24.301 v10.2.0 (Mar. 2011) 315 pages.

* cited by examiner

| Command | Possible response(s) |
|---|---|
| ARMEE=[<n>] | |
| $ARMMEE? | $ARMEE: <n> |
| $ARMEE=?$ | $ARMEE: (list of supported <n>s) |

| HEADER | $ARME Error | |
|---|---|---|
| | Byte 1 : Error Type | Byte 2 : Reject Error |
| '01' | MM Reject code is received during an MM procedure | See 3GPP TS 24.008, 10.5.3.6 Reject Cause |
| '02' | CM Reject code is received during a CM procedure | See 3GPP TS 24.008, 10.5.3.6 Reject Cause |
| '03' | GMM Reject code is received during a non-combined GMM procedure for GPRS services | See 3GPP TS 24.008, 10.5.5.14 GMM Cause |
| '04' | SM Reject is received | See 3GPP TS 24.008, 10.5.6.6 |
| '05' | GMM reject code is received during a combined GMM procedure for non-GPRS services | See 3GPP TS 24.008, 10.5.5.14 GMM Cause |
| '06' | GMM reject code is received during a combined GMM procedure for GPRS and non-GPRS services | See 3GPP TS 24.008, 10.5.5.14 GMM Cause |
| '07' | EMM reject code is received for a non-combined EMM procedure for EPS | See 3GPP TS 24.301, EMM Cause |
| '08' | EMM reject code is received during a combined procedure for non-EPS | See 3GPP TS 24.301, EMM Cause |
| '09' | EMM reject code is received during a combined procedure for EPS and non-EPS services | See 3GPP TS 24.301, EMM Cause |
| '0A' | ESM reject code is received during an ESM procedure | See 3GPP TS 24.301, 9.9.4.4 |
| '0B'-'FF' | (RFU) Reserved for Future Use | — |
| 'XX' | This shall be in the range 01-0A | '00' - Request from TA was ignored by the network for the specific 'error type'. |

*Reject Cause* information element

| Bits 8 7 6 5 4 3 2 1 | Description |
|---|---|
| Reject cause value (octet 2) | |
| 0 0 0 0 0 0 1 0 | IMSI unknown in HLR |
| 0 0 0 0 0 0 1 1 | Illegal MS |
| 0 0 0 0 0 1 0 0 | IMSI unknown in VLR |
| 0 0 0 0 0 1 0 1 | IMEI not accepted |
| 0 0 0 0 0 1 1 0 | Illegal ME |
| 0 0 0 0 1 0 1 1 | PLMN not allowed |
| 0 0 0 0 1 1 0 0 | Location Area not allowed |
| 0 0 0 0 1 1 0 1 | Roaming not allowed in this location area |
| 0 0 0 0 1 1 1 1 | No Suitable Cells In Location Area |
| 0 0 0 1 0 0 0 1 | Network failure |
| 0 0 0 1 0 1 0 0 | MAC failure |
| 0 0 0 1 0 1 0 1 | Synch failure |
| 0 0 0 1 0 1 1 0 | Congestion |
| 0 0 0 1 0 1 1 1 | GSM authentication unacceptable |
| 0 0 0 1 1 0 0 1 | Not authorized for this CSG |
| 0 0 1 0 0 0 0 0 | Service option not supported |
| 0 0 1 0 0 0 0 1 | Requested service option not subscribed |
| 0 0 1 0 0 0 1 0 | Service option temporarily out of order |
| 0 0 1 0 0 1 1 0 | Call cannot be identified |
| 0 0 1 1 0 0 0 0 | } |
| to | } retry upon entry into a new cell |
| 0 0 1 1 1 1 1 1 | } |
| 0 1 0 1 1 1 1 1 | Semantically incorrect message |
| 0 1 1 0 0 0 0 0 | Invalid mandatory information |
| 0 1 1 0 0 0 0 1 | Message type non-existent or not implemented |
| 0 1 1 0 0 0 1 0 | Message type not compatible with the protocol state |
| 0 1 1 0 0 0 1 1 | Information element non-existent or not implemented |
| 0 1 1 0 0 1 0 0 | Conditional IE error |
| 0 1 1 0 0 1 0 1 | Message not compatible with the protocol state |
| 0 1 1 0 1 1 1 1 | Protocol error, unspecified |

Any other value received by the mobile station shall be treated as 0010 0010, 'Service option temporarily out of order'. Any other value received by the network shall be treated as 0110 1111, 'Protocol error, unspecified'.

FIG. 7

GMM cause information element

| Cause value (octet 2) Bits | | | | | | | | |
|---|---|---|---|---|---|---|---|---|
| 8 | 7 | 6 | 5 | 4 | 3 | 2 | 1 | |
| 0 | 0 | 0 | 0 | 0 | 0 | 1 | 0 | IMSI unknown in HLR |
| 0 | 0 | 0 | 0 | 0 | 0 | 1 | 1 | Illegal MS |
| 0 | 0 | 0 | 0 | 0 | 1 | 0 | 1 | IMEI not accepted |
| 0 | 0 | 0 | 0 | 0 | 1 | 1 | 0 | Illegal ME |
| 0 | 0 | 0 | 0 | 0 | 1 | 1 | 1 | GPRS services not allowed |
| 0 | 0 | 0 | 0 | 1 | 0 | 0 | 0 | GPRS services and non-GPRS services not allowed |
| 0 | 0 | 0 | 0 | 1 | 0 | 0 | 1 | MS identity cannot be derived by the network |
| 0 | 0 | 0 | 0 | 1 | 0 | 1 | 0 | Implicitly detached |
| 0 | 0 | 0 | 0 | 1 | 0 | 1 | 1 | PLMN not allowed |
| 0 | 0 | 0 | 0 | 1 | 1 | 0 | 0 | Location Area not allowed |
| 0 | 0 | 0 | 0 | 1 | 1 | 0 | 1 | Roaming not allowed in this location area |
| 0 | 0 | 0 | 0 | 1 | 1 | 1 | 0 | GPRS services not allowed in this PLMN |
| 0 | 0 | 0 | 0 | 1 | 1 | 1 | 1 | No Suitable Cells In Location Area |
| 0 | 0 | 0 | 1 | 0 | 0 | 0 | 0 | MSC temporarily not reachable |
| 0 | 0 | 0 | 1 | 0 | 0 | 0 | 1 | Network failure |
| 0 | 0 | 0 | 1 | 0 | 1 | 0 | 0 | MAC failure |
| 0 | 0 | 0 | 1 | 0 | 1 | 0 | 1 | Synch failure |
| 0 | 0 | 0 | 1 | 0 | 1 | 1 | 0 | Congestion |
| 0 | 0 | 0 | 1 | 0 | 1 | 1 | 1 | GSM authentication unacceptable |
| 0 | 0 | 0 | 1 | 1 | 0 | 0 | 1 | Not authorized for this CSG |
| 0 | 0 | 1 | 0 | 1 | 0 | 0 | 0 | No PDP context activated |
| 0 | 0 | 1 | 1 | 0 | 0 | 0 | 0 | } |
| | | | to | | | | | } retry upon entry into a new cell |
| 0 | 0 | 1 | 1 | 1 | 1 | 1 | 1 | } |
| 0 | 1 | 0 | 1 | 1 | 1 | 1 | 1 | Semantically incorrect message |
| 0 | 1 | 1 | 0 | 0 | 0 | 0 | 0 | Invalid mandatory information |
| 0 | 1 | 1 | 0 | 0 | 0 | 0 | 1 | Message type non-existent or not implemented |
| 0 | 1 | 1 | 0 | 0 | 0 | 1 | 0 | Message type not compatible with the protocol state |
| 0 | 1 | 1 | 0 | 0 | 0 | 1 | 1 | Information element non-existent or not implemented |
| 0 | 1 | 1 | 0 | 0 | 1 | 0 | 0 | Conditional IE error |
| 0 | 1 | 1 | 0 | 0 | 1 | 0 | 1 | Message not compatible with the protocol state |
| 0 | 1 | 1 | 0 | 1 | 1 | 1 | 1 | Protocol error, unspecified |

Any other value received by the mobile station shall be treated as 0110 1111, "Protocol error, unspecified". Any other value received by the network shall be treated as 0110 1111, "Protocol error, unspecified".

FIG. 8

SM cause information element

```
Cause value (octet 2)
Bits
8 7 6 5 4 3 2 1
0 0 0 0 1 0 0 0    Operator Determined Barring
0 0 0 1 1 0 0 0    MBMS bearer capabilities insufficient for the service
0 0 0 1 1 0 0 1    LLC or SNDCP failure(A/Gb mode only)
0 0 0 1 1 0 1 0    Insufficient resources
0 0 0 1 1 0 1 1    Missing or unknown APN
0 0 0 1 1 1 0 0    Unknown PDP address or PDP type
0 0 0 1 1 1 0 1    User authentication failed
0 0 0 1 1 1 1 0    Activation rejected by GGSN, Serving GW or PDN GW
0 0 0 1 1 1 1 1    Activation rejected, unspecified
0 0 1 0 0 0 0 0    Service option not supported
0 0 1 0 0 0 0 1    Requested service option not subscribed
0 0 1 0 0 0 1 0    Service option temporarily out of order
0 0 1 0 0 0 1 1    NSAPI already used (not sent)
0 0 1 0 0 1 0 0    Regular deactivation
0 0 1 0 0 1 0 1    QoS not accepted
0 0 1 0 0 1 1 0    Network failure
0 0 1 0 0 1 1 1    Reactivation requested
0 0 1 0 1 0 0 0    Feature not supported
0 0 1 0 1 0 0 1    Semantic error in the TFT operation
0 0 1 0 1 0 1 0    Syntactical error in the TFT operation
0 0 1 0 1 0 1 1    Unknown PDP context
0 0 1 0 1 1 0 0    Semantic errors in packet filter(s)
0 0 1 0 1 1 0 1    Syntactical errors in packet filter(s)
0 0 1 0 1 1 1 0    PDP context without TFT already activated
0 0 1 0 1 1 1 1    Multicast group membership time-out
0 0 1 1 0 0 0 0    Activation rejected, BCM violation
0 0 1 1 0 0 1 0    PDP type IPv4 only allowed
0 0 1 1 0 0 1 1    PDP type IPv6 only allowed
0 0 1 1 0 1 0 0    Single address bearers only allowed
0 0 1 1 1 0 0 0    Collision with network initiated request
0 1 0 1 0 0 0 1    Invalid transaction identifier value
0 1 0 1 1 1 1 1    Semantically incorrect message
0 1 1 0 0 0 0 0    Invalid mandatory information
0 1 1 0 0 0 0 1    Message type non-existent or not implemented
0 1 1 0 0 0 1 0    Message type not compatible with the protocol state
0 1 1 0 0 0 1 1    Information element non-existent or not implemented
0 1 1 0 0 1 0 0    Conditional IE error
0 1 1 0 0 1 0 1    Message not compatible with the protocol state
0 1 1 0 1 1 1 1    Protocol error, unspecified
0 1 1 1 0 0 0 0    APN restriction value incompatible with active PDP context Any other value received by the mobile station shall be treated as 0010 0010, "Service
option temporarily out of order". Any other value received by the network shall be treated as
0110 1111, "Protocol error, unspecified".
```

FIG. 9

EMM cause information element

| Cause value (octet 2) | | | | | | | | |
|---|---|---|---|---|---|---|---|---|
| Bits | | | | | | | | |
| 8 | 7 | 6 | 5 | 4 | 3 | 2 | 1 | |
| 0 | 0 | 0 | 0 | 0 | 0 | 1 | 0 | IMSI unknown in HSS |
| 0 | 0 | 0 | 0 | 0 | 0 | 1 | 1 | Illegal UE |
| 0 | 0 | 0 | 0 | 0 | 1 | 0 | 1 | IMEI not accepted |
| 0 | 0 | 0 | 0 | 0 | 1 | 1 | 0 | Illegal ME |
| 0 | 0 | 0 | 0 | 0 | 1 | 1 | 1 | EPS services not allowed |
| 0 | 0 | 0 | 0 | 1 | 0 | 0 | 0 | EPS services and non-EPS services not allowed |
| 0 | 0 | 0 | 0 | 1 | 0 | 0 | 1 | UE identity cannot be derived by the network |
| 0 | 0 | 0 | 0 | 1 | 0 | 1 | 0 | Implicitly detached |
| 0 | 0 | 0 | 0 | 1 | 0 | 1 | 1 | PLMN not allowed |
| 0 | 0 | 0 | 0 | 1 | 1 | 0 | 0 | Tracking Area not allowed |
| 0 | 0 | 0 | 0 | 1 | 1 | 0 | 1 | Roaming not allowed in this tracking area |
| 0 | 0 | 0 | 0 | 1 | 1 | 1 | 0 | EPS services not allowed in this PLMN |
| 0 | 0 | 0 | 0 | 1 | 1 | 1 | 1 | No Suitable Cells In tracking area |
| 0 | 0 | 0 | 1 | 0 | 0 | 0 | 0 | MSC temporarily not reachable |
| 0 | 0 | 0 | 1 | 0 | 0 | 0 | 1 | Network failure |
| 0 | 0 | 0 | 1 | 0 | 0 | 1 | 0 | CS domain not available |
| 0 | 0 | 0 | 1 | 0 | 0 | 1 | 1 | ESM failure |
| 0 | 0 | 0 | 1 | 0 | 1 | 0 | 0 | MAC failure |
| 0 | 0 | 0 | 1 | 0 | 1 | 0 | 1 | Synch failure |
| 0 | 0 | 0 | 1 | 0 | 1 | 1 | 0 | Congestion |
| 0 | 0 | 0 | 1 | 0 | 1 | 1 | 1 | UE security capabilities mismatch |
| 0 | 0 | 0 | 1 | 1 | 0 | 0 | 0 | Security mode rejected, unspecified |
| 0 | 0 | 0 | 1 | 1 | 0 | 0 | 1 | Not authorized for this CSG |
| 0 | 0 | 0 | 1 | 1 | 0 | 1 | 0 | Non-EPS authentication unacceptable |
| 0 | 0 | 1 | 0 | 0 | 1 | 1 | 1 | CS service temporarily not available |
| 0 | 0 | 1 | 0 | 1 | 0 | 0 | 0 | No EPS bearer context activated |
| 0 | 1 | 0 | 1 | 1 | 1 | 1 | 1 | Semantically incorrect message |
| 0 | 1 | 1 | 0 | 0 | 0 | 0 | 0 | Invalid mandatory information |
| 0 | 1 | 1 | 0 | 0 | 0 | 0 | 1 | Message type non-existent or not implemented |
| 0 | 1 | 1 | 0 | 0 | 0 | 1 | 0 | Message type not compatible with the protocol state |
| 0 | 1 | 1 | 0 | 0 | 0 | 1 | 1 | Information element non-existent or not implemented |
| 0 | 1 | 1 | 0 | 0 | 1 | 0 | 0 | Conditional IE error |
| 0 | 1 | 1 | 0 | 0 | 1 | 0 | 1 | Message not compatible with the protocol state |
| 0 | 1 | 1 | 0 | 1 | 1 | 1 | 1 | Protocol error, unspecified |

Any other value received by the mobile station shall be treated as 0110 1111, "protocol error, unspecified". Any other value received by the network shall be treated as 0110 1111, "protocol error, unspecified".

FIG. 10

ESM cause information element

| Cause value (octet 2) | |
|---|---|
| Bits | |
| 8 7 6 5 4 3 2 1 | |
| 0 0 0 0 1 0 0 0 | Operator Determined Barring |
| 0 0 0 1 1 0 1 0 | Insufficient resources |
| 0 0 0 1 1 0 1 1 | Unknown or missing APN |
| 0 0 0 1 1 1 0 0 | Unknown PDN type |
| 0 0 0 1 1 1 0 1 | User authentication failed |
| 0 0 0 1 1 1 1 0 | Request rejected by Serving GW or PDN GW |
| 0 0 0 1 1 1 1 1 | Request rejected, unspecified |
| 0 0 1 0 0 0 0 0 | Service option not supported |
| 0 0 1 0 0 0 0 1 | Requested service option not subscribed |
| 0 0 1 0 0 0 1 0 | Service option temporarily out of order |
| 0 0 1 0 0 0 1 1 | PTI already in use |
| 0 0 1 0 0 1 0 0 | Regular deactivation |
| 0 0 1 0 0 1 0 1 | EPS QoS not accepted |
| 0 0 1 0 0 1 1 0 | Network failure |
| 0 0 1 0 0 1 1 1 | Reactivation requested |
| 0 0 1 0 1 0 0 1 | Semantic error in the TFT operation |
| 0 0 1 0 1 0 1 0 | Syntactical error in the TFT operation |
| 0 0 1 0 1 0 1 1 | Invalid EPS bearer identity |
| 0 0 1 0 1 1 0 0 | Semantic errors in packet filter(s) |
| 0 0 1 0 1 1 0 1 | Syntactical errors in packet filter(s) |
| 0 0 1 0 1 1 1 0 | Unused (see NOTE 2) |
| 0 0 1 0 1 1 1 1 | PTI mismatch |
| 0 0 1 1 0 0 0 1 | Last PDN disconnection not allowed |
| 0 0 1 1 0 0 1 0 | PDN type IPv4 only allowed |
| 0 0 1 1 0 0 1 1 | PDN type IPv6 only allowed |
| 0 0 1 1 0 1 0 0 | Single address bearers only allowed |
| 0 0 1 1 0 1 0 1 | ESM information not received |
| 0 0 1 1 0 1 1 0 | PDN connection does not exist |
| 0 0 1 1 0 1 1 1 | Multiple PDN connections for a given APN not allowed |
| 0 0 1 1 1 0 0 0 | Collision with network initiated request |
| 0 0 1 1 1 0 1 1 | Unsupported QCI value |
| 0 0 1 1 1 1 0 0 | Bearer handling not supported |
| 0 1 0 1 0 0 0 1 | Invalid PTI value |
| 0 1 0 1 1 1 1 1 | Semantically incorrect message |
| 0 1 1 0 0 0 0 0 | Invalid mandatory information |
| 0 1 1 0 0 0 0 1 | Message type non-existent or not implemented |
| 0 1 1 0 0 0 1 0 | Message type not compatible with the protocol state |
| 0 1 1 0 0 0 1 1 | Information element non-existent or not implemented |
| 0 1 1 0 0 1 0 0 | Conditional IE error |
| 0 1 1 0 0 1 0 1 | Message not compatible with the protocol state |
| 0 1 1 0 1 1 1 1 | Protocol error, unspecified |
| 0 1 1 1 0 0 0 0 | APN restriction value incompatible with active EPS bearer context |

Any other value received by the UE shall be treated as 0010 0010, "service option temporarily out of order". Any other value received by the network shall be treated as 0110 1111, "protocol error, unspecified".

SENDING NETWORK REJECT/ERROR CODES FROM A TERMINAL ADAPTOR TO TERMINAL EQUIPMENT THROUGH AN AT COMMAND INTERFACE

CROSS-REFERENCE TO RELATED APPLICATION(S)

This application is a continuation of U.S. patent application Ser. No. 13/156,951, filed Jun. 9, 2011, entitled "Sending Network Reject/Error Codes from a Terminal Adaptor to Terminal Equipment Through an at Command Interface," which is incorporated herein by reference.

BACKGROUND

1. Field of the Invention

This invention relates to communications between a terminal adaptor and terminal equipment and more particularly to reporting of error conditions.

2. Description of the Related Art

When Terminal Equipment (TE) such as computers, devices, application processors, wishes to access wireless services such as Third Generation Partnership Project (3GPP) services, the TE sends a request using attention (AT) commands to a terminal adaptor (TA). The TA includes circuits, such as in mobile devices that support 3GPP services.

Once the TE sends the request to the TA, the TA communicates with a 3GPP network to obtain services by, e.g., sending a service request to the network. Service requests can be accepted, rejected or even ignored by the network. Service requests can be denied by the network for a variety of reasons including network failure, network congestion, a user not being authorized for a requested service, or a user not being allowed to access the public land mobile network (PLMN).

When the service request is denied, the network sends a reject message which includes a reject/error code to the TA. Currently there is no good mechanism for the TA to forward this information to the TE. So in most cases the TE does not know the exact reason why the service requests fail. As the result, the TE cannot take appropriate action to recover from the failure. Lack of knowledge of the reason for the failure can lead to problematic TE behaviors. For example, if the TE fails in its attempt to access wireless service even though service is available, a had user experience can result leading to a potential loss of revenue for the carrier. If the TE keeps requesting the TA for service when service is not available, the repeated requests can lead to the battery draining very quickly and an excessive number of signaling messages being sent to network in a short period of time, which in the extreme case might bring the network down.

In the case of a service request being ignored by the network, the user equipment (UE) typically resends the request after a time-out period. In some cases, this resending of the service request can potentially continue indefinitely and may also result in an excessive number of requests being made to the network, which may impact the network adversely. In the case of these requests being ignored by the network, there is no defined mechanism for the TA to inform the TE of this condition.

SUMMARY

In order to provide more information to the TE on failures in the network, mechanisms are defined to send network reject/error codes from the TA to the TE through the AT command interface.

In an embodiment a method is provided to send error information from a terminal adaptor that accesses a wireless network, to a terminal equipment coupled to access the wireless network through the terminal adaptor, in response to an error condition existing with respect to communications over the wireless network by the terminal adaptor. The error information is sent in response to existence of any one of a plurality of errors conditions with respect to access to the wireless network and the error information includes an error type identifying a domain associated with a source of a particular one of the error conditions and an error code providing a reject error cause for the particular one of the error conditions. One of the plurality of error conditions may include an unsolicited error received by the terminal adaptor from the wireless network or when a request by the TA is ignored by the wireless network.

In another embodiment a terminal adaptor is provided that includes a communication component configured to send error information to a connected entity. The connected entity accesses a wireless network through the terminal adaptor. The error information is sent in response to an error condition existing with respect to communications over the wireless network, the error information being sent in response to existence of any one of a plurality of errors conditions with respect to access to the wireless network, the plurality of error conditions including a request that is ignored by wireless network. The plurality of error conditions may further include an unsolicited error being received by the terminal adaptor from the wireless network. The error information includes a domain indication in the error information indicative of a network entity associated with the error information and an error type identifying the domain and an error code providing a reject error cause.

BRIEF DESCRIPTION OF THE DRAWINGS

The present invention may be better understood, and its numerous objects, features, and advantages made apparent to those skilled in the art by referencing the accompanying drawings.

FIG. 7 illustrates exemplary information supplied in the second byte of the ARME command according to an embodiment of the invention.

FIG. 9 illustrates exemplary information supplied in the second byte of the ARME command according to an embodiment of the invention.

FIG. 10 illustrates exemplary information supplied in the second byte of the ARME command according to an embodiment of the invention.

FIG. 11 illustrates exemplary information supplied in the second byte of the ARME command according to an embodiment of the invention.

The use of the same reference symbols in different drawings indicates similar or identical items.

DESCRIPTION OF THE PREFERRED EMBODIMENT(S)

Figure 1:
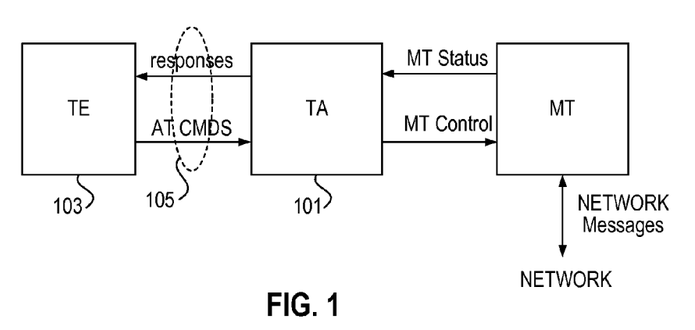
FIG. 1 illustrates a TA and TE in accordance with aspects of the subject disclosure.
Figure 2:
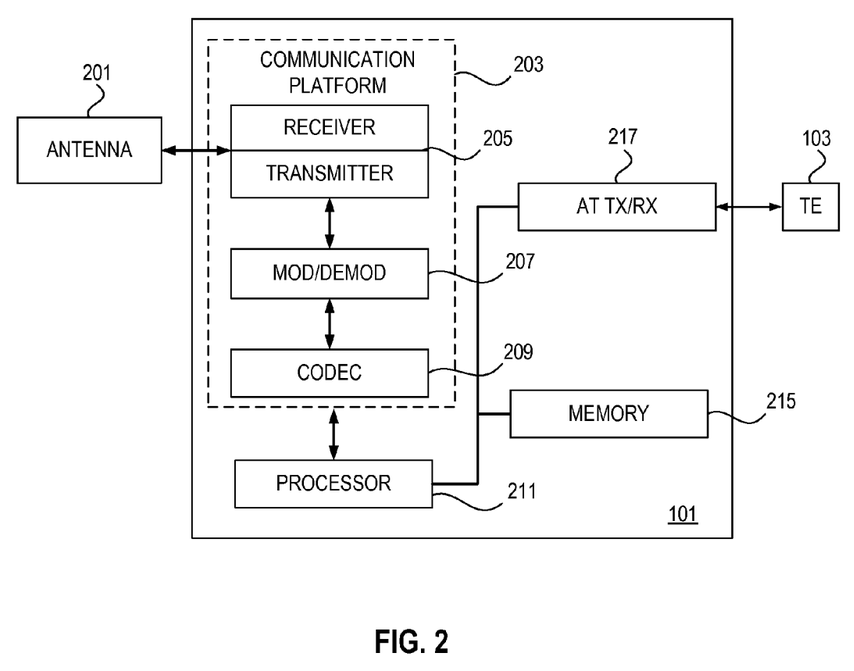
FIG. 2 depicts a block diagram of portions of a TA device in accordance with aspects of the subject disclosure.

Referring to FIG. 1 illustrated is a high level block diagram of a Terminal Adaptor (TA) 101 coupled to Terminal Equipment (TE) 103 through an AT command interface 105. As shown in FIG. 1, when the TE wants to communicate over the network, commands are sent from the TE 101 to the TA 103. The TA 103 then communicates with the network to request appropriate services. When a failure occurs in the network, the network provides status hack to the TA. Note that the TA and MT shown in FIG. 2 are logical functions that are typically implemented in a single entity, e.g., a chipset. In some embodiments, the TA and TE are combined in one device such as a notebook, computer, or tablet with built-in 3G capability. The TA may be implemented using chipsets providing RF network communication capability. In other embodiments, the TA and TE are in two separate devices. For example, the TE could be tethered via a universal serial bus (USB) port to the TA to obtain 3GPP services. Short range wireless technology such as Bluetooth may be used to connect the TA and TE. Alternatively, in embodiments where the TE and TA are integrated in the same device. By way of example, and not limitation, communication between the TE and TA can be accomplished using any wired communication capability including USE or other wired connection, or wireless communication capability including acoustic, RF, infrared and other wireless media.

FIG. 2 illustrates a high level block diagram of aspects of the TA. The TA includes one or more antennas 201, a communication platform 203 that includes transceiver 205, modulator/demodulator 207 and a codec component 209. Other aspects of the communication platform at not shown for ease in illustrating relevant aspects of the TA. Various aspects of control functionality may be implemented in hardware in the communication platform 203 and by a processor 211 operating under control of software stored in memory 215. That processor, by executing software stored in memory 215, which may include non-volatile memory and/or volatile memory, may also implement functionality associated with processing requests from the TE and sending error information to the TE. The TA further includes a serial communication interface 217 for transmitting and receiving AT commands, which may through a wired or wireless connection as discussed above. The TE can be incorporated any device such as a computer, tablet, or other emerging device that requires wireless network access.

Figure 3:
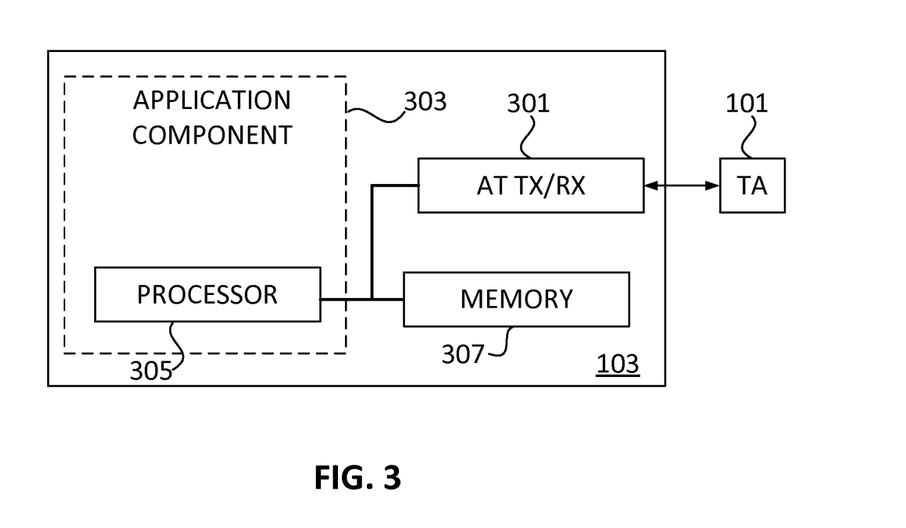
FIG. 3 depicts a block diagram of portions of a TE device in accordance with aspects of the subject disclosure.

FIG. 3 illustrates a high level block diagram of a TE 103 that includes an interface 301 to send AT command to the TA 101 and to receive error information as described further herein. An application component 303 may provide various capabilities to the user of the device 103 and have at least some of its capabilities provided by processor 305 executing software stored in memory 307. In addition, the processor may execute code stored in memory 307 to provide control functionality for AT interface 301 and to process information received from the AT interface with respect to errors that occur in the network to allow the TE to make an informed decision as to actions to take with respect to requesting network services when errors occur in the network.

As employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gale or transistor logic, discrete hardware components, or any combination thereof designed to perform the functions described herein.

In the subject specification, terms such as "memory," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

Figure 4:
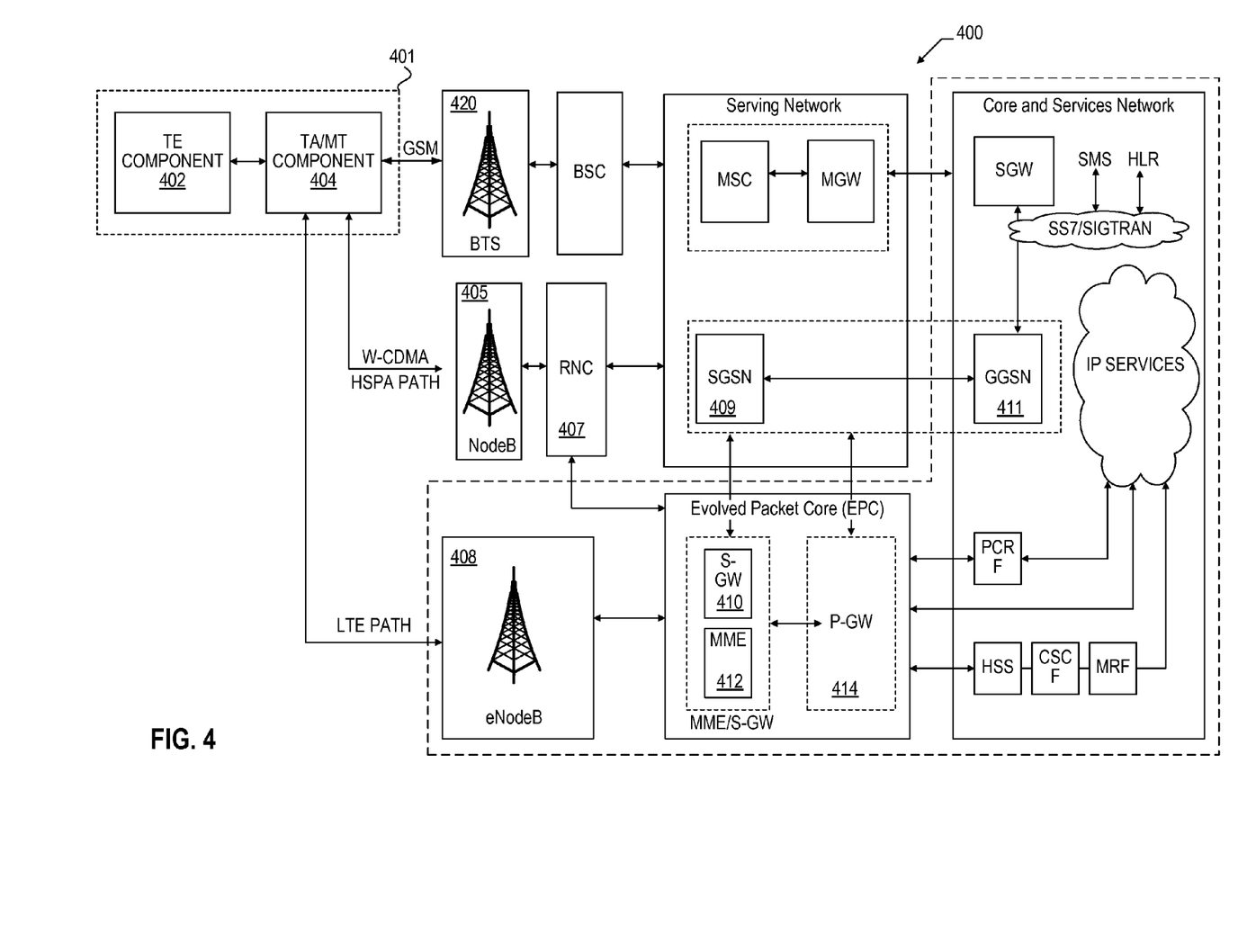
FIG. 4 depicts network in accordance with aspects of the subject disclosure.

FIG. 4 illustrates an exemplary system 400 in accordance with aspects of the subject disclosure including a network over which the TA may be configured to communicate. System 400 can include a TE/TA component 401. The TE 402 may be incorporated in user equipment that can seek access to a telecommunications carrier network through TA 404. The TE/TA component 401, or just the TA or TE, may be incorporated in a cell phone, smart phone, tablet computer, personal computer (PC), smart meter, connected appliance (e.g., internet connected refrigerator, etc.), e-reader, car computer, etc. The TA 404 can be coupled to communicate over a carrier network that provides high speed packet access (HSPA), and/or long term evolution (LTE) capabilities. By way of example, system 400 illustrates a Global Systems for Mobile Communication (GSM) path through base transceiver station (BTS) 420, a High Speed Packet Access (HSPA) path by way of a NodeB 405 and a Long Term Evolution (LTE) path by way of an eNodeB 408.

System 400 includes core carrier network components from which reject codes can originate. A HSPA path can include, for example, NodeB 405, Radio Network Controller (RNC) 407, Serving GPRS Support Node (SGS) component 409 and Gateway GPRS Support Node (GGSN) component 411. An exemplary LTE path can include eNodeB 408, Serving Gateway (SGW) 410, Mobility Management Entity (MME) component 412 and public data network (PDN) gateway component 414. Embodiments described herein provide for transferring information from the TA to the TE regarding network rejects from the network, such as the network described in associated with system 400 and their associated error codes, along with an indication of when a service request is ignored by the network.

There are currently two AT commands described in 3GPP TS 27.007 that can be used by a TA to send some error information to TE. Once such command is AT+CEER. The error information provided in by AT+CEER is in text format. There is no definition of when and what shall be sent in each failure scenario. Thus, it is very hard for a TE to effectively utilize non uniform text information in any useful way. Such information may be provided to the user of the equipment but not provide the device direction as to an appropriate course of action, e.g., as to whether to continue retries on the network to try and obtain the services.

Another such command is AT+CME, which might be sent in response to a failed AT command to give some information about the cause of the failure. But if the network sends an unsolicited reject/error code, the TA does not send AT+CME. Also there is no mechanism to indicate which network entity from which the reject/error comes. Without that information, TE will not know if there is an issue with a particular service or all services. For example, if the Packet Switch network is down, the Circuit Switch service might still be available. Furthermore, AT+CME is not sent if the service request from TA is ignored by network.

In accordance with aspects of the present disclosure, a flexible mechanism is provided for the TE to distinguish network reject/error codes along with the network entities which sends the reject/error. In addition, the scenario where service requests are ignored by the network can be communicated to the TE by the TA. The mechanism works even in the scenario where the network sends unsolicited reject/error codes. By utilizing embodiments described herein, the TE has a clearer picture what the issue is that led the reject, an unsolicited error, or a failure to respond to a request, and can act accordingly.

Figure 5:
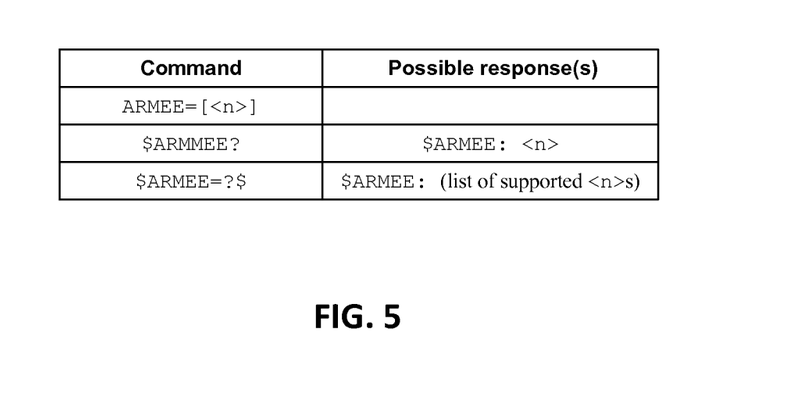
FIG. 5 depicts an exemplary embodiment of the syntax of the ARMEE command that enables error reporting.

In accordance with aspects of the present disclosure, the following AT commands, Agent Reporting Mobile Error Enable (AT$ARMEE) and Agent Reporting Mobile Error (AT$ARME), are defined. AT$ARMEE provides a mechanism to enable/disable the use of the ARME error indication. AT$ARME defines the type of reject code and the specific reject code as well as a way to indicate a 'no response" from the network for a specific type of request. FIG. 5 illustrates the AT$ARMEE command. The enable command disables or enables the use of error code command $ARME as an indication of an error relating to the network. When enabled, error code $ARME ERROR: <type> <err> is returned if a network sends a reject code or ignores a request from TA. The command is independent of the AT+CMEE command.

A test command may be used to determine the values that are set by the enable command. The test command returns values supported as a compound value. For example, the command may return a value of "1" indicating an enabled condition and a "0" indicating a disabled condition.

Figure 6:
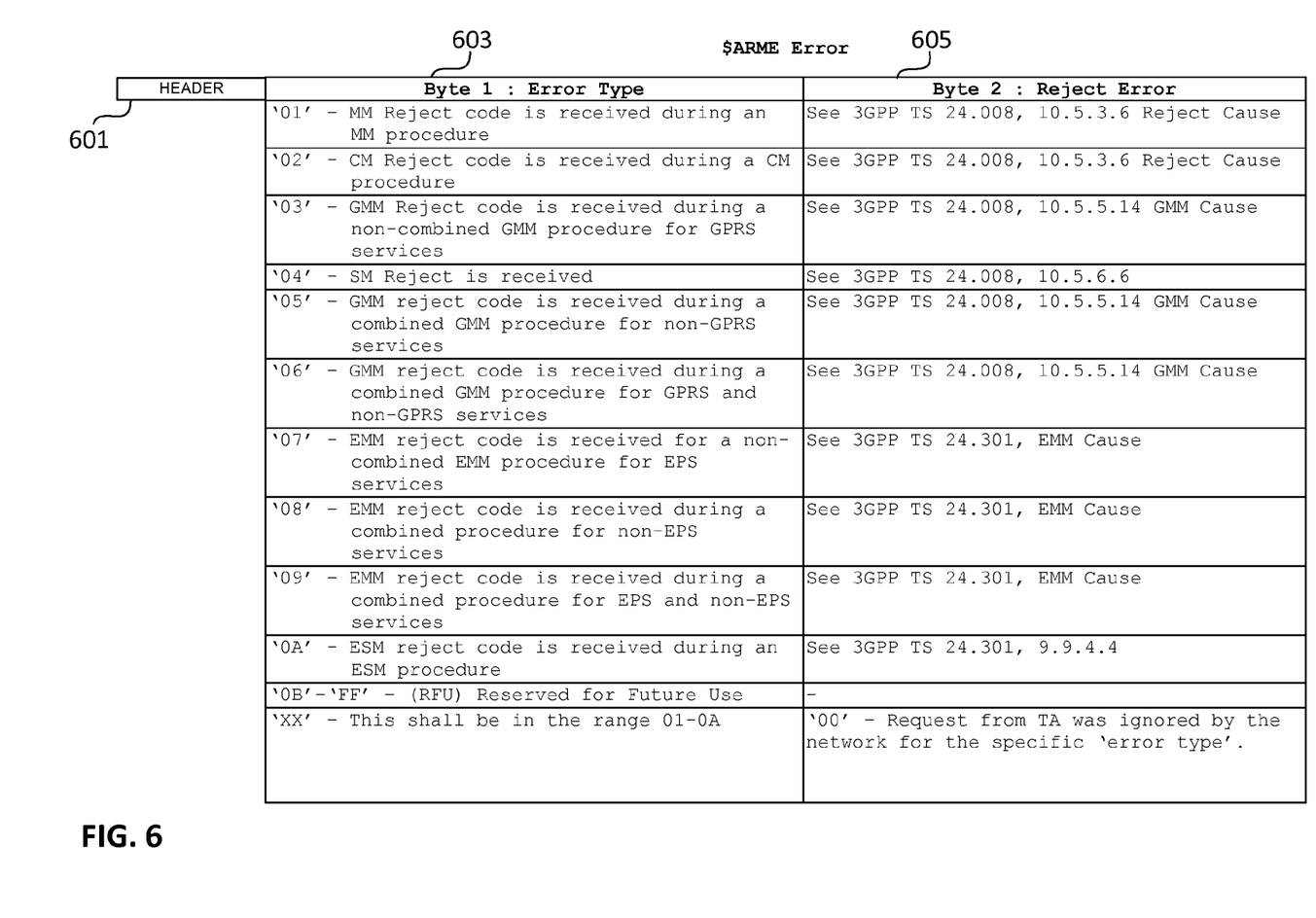
FIG. 6 illustrates information supplied in two bytes of the ARME command.
Figure 8:
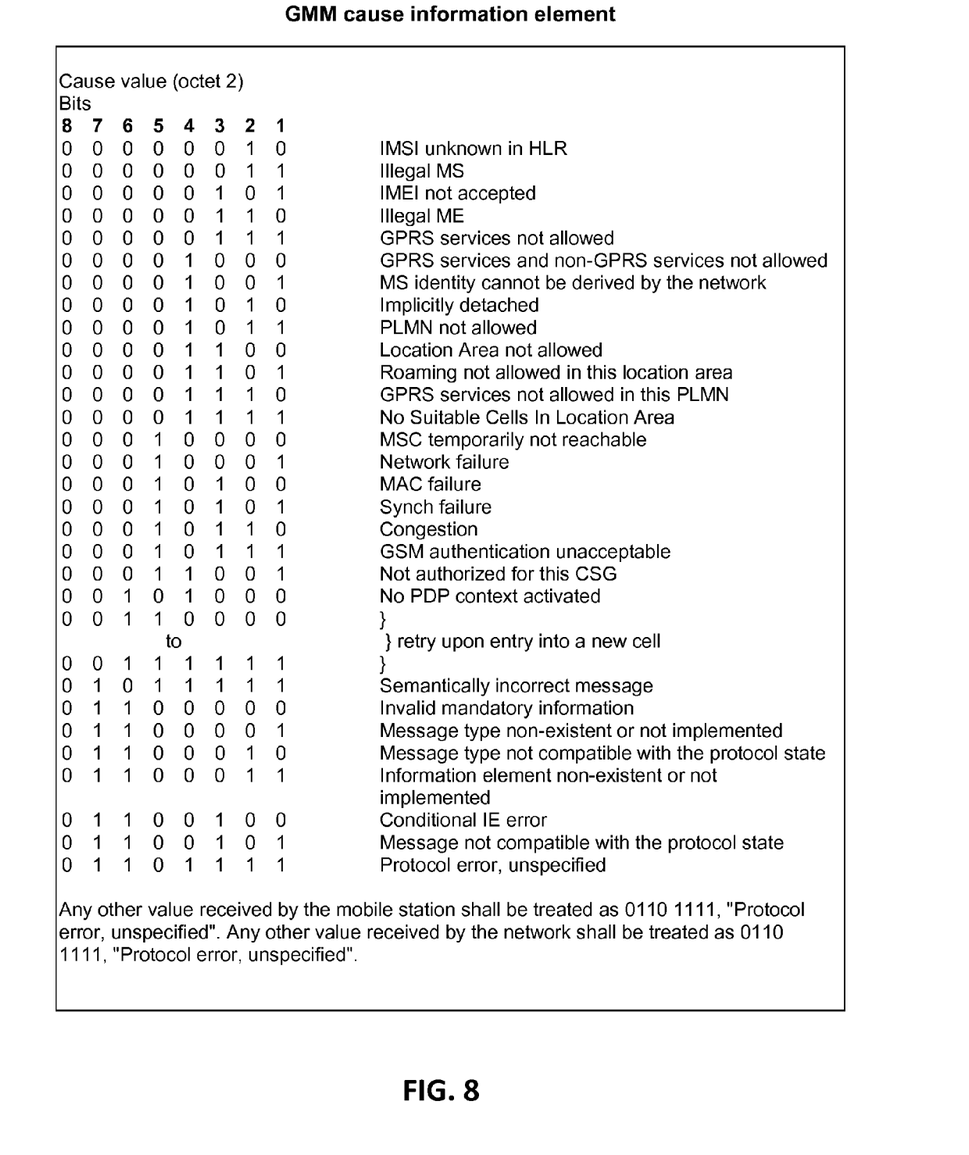
FIG. 8 illustrates exemplary information supplied in the second byte of the ARME command according to an embodiment of the invention.

FIG. 6 describes the AT$ARME information that may be provided by the TA to the TE when an error occurs in the network. The command sent by the TA and received by the TE has a header 601 indicating the particular AT command (ARME) and two bytes 603 and 605 as shown in FIG. 6. The Error Type in byte 1 provides an identity of the network entity that sent the reject. For example, error type "01" indicates a Mobility Management (MM) reject code that was received during an MM procedure. Error type "02" indicates the reject came during a Connection Management (CM) procedure. Error type '03' indicates a GPRS Mobility Management (GMM) Reject code is received during a non-combined GMM procedure for Generalized Packet Radio Services (GPRS) services. Error type '04' indicates a Session Management (SM) Reject is received. Error type '05' indicates a GMM reject code was received during a combined GMM procedure for non-GPRS services. Error type '06' indicates a GMM reject code was received during a combined GMM procedure for GPRS and non-GPRS services. Error type '07' indicates an EPS Mobility Management (EMM) reject code is received code is received for a non-combined EMM procedure for Evolved Packet System (EPS) services. Error type '08' indicates an EMM reject code is received during a combined procedure for non-EPS services. Error code '09' indicates an EMM reject code is received during a combined procedure for EPS and non-EPS services. Error type '0A' indicates an EPS Session Management (ESM) reject code is received during an ESM procedure. Error types '0B'-'FF' may be reserved for future use. For example, the "Error Type" can include additional error types of requests made in other technologies such as WiMax and WiFi.

Byte 2 provides specifics reject cause. For example, the GMM cause information element indicates the reason why a GMM request from the mobile station is rejected by the network. The SM cause information element indicates the reason why a session management request is rejected. The EMM cause information element indicates the reason why an EMM request from the UE is rejected by the network. The ESM cause information element indicates the reason why a session management request is rejected. Other exemplary reject causes for byte 2 are shown in FIGS. 7-11 and correspond to the reject error cause indentified in byte 2 in FIG. 6. With this solution, the TA can clearly indicate to the TE the specific reject/error code it receives from the network (byte 2) and the entity that sends the reject/error. The TA sends the indication even if the reject/error is unsolicited. The TA also informs the TE when a request is ignored by network. The solution is flexible in that new error types can be easily added as new technologies and system capabilities provide additional error types.

In addition byte 2 can indicate a '00' indicating a request from the TA was ignored for the specific error type. With the error information from the TA, the TE has a clear view of the reason for the failure and it can then take proper action to achieve the better performance and at the same time not behave aggressively towards the network. For example, if the entire network or parts of it are down, the TE can use a back-off algorithm and logic to prevent it from aggressively accessing the network, which will enable network/node recovery. Additionally, if only one service is not operational, the TA can use an alternate service which may be available. The TA can also detect the scenario when a service request is ignored by network, which it previously has no knowledge of.

The use of these two commands can significantly improve the usability and development of applications in the mobile to mobile space.

Creation and transmission of the error types and reject error cause can be facilitated using the processor shown, e.g., in FIG. 2, using computer-executable instructions running on the processor. Those skilled in the art will recognize that the subject innovation also can be implemented in combination with other modules such as hardware modules to facilitate communication between the TA and TE and between the TA and the network. In an embodiment, the appropriate combination of hardware and software executing on a processor or processors can be used to receive information from the network, create appropriate commands to transmit to the TE and to transmit those commands.

Figure 12:
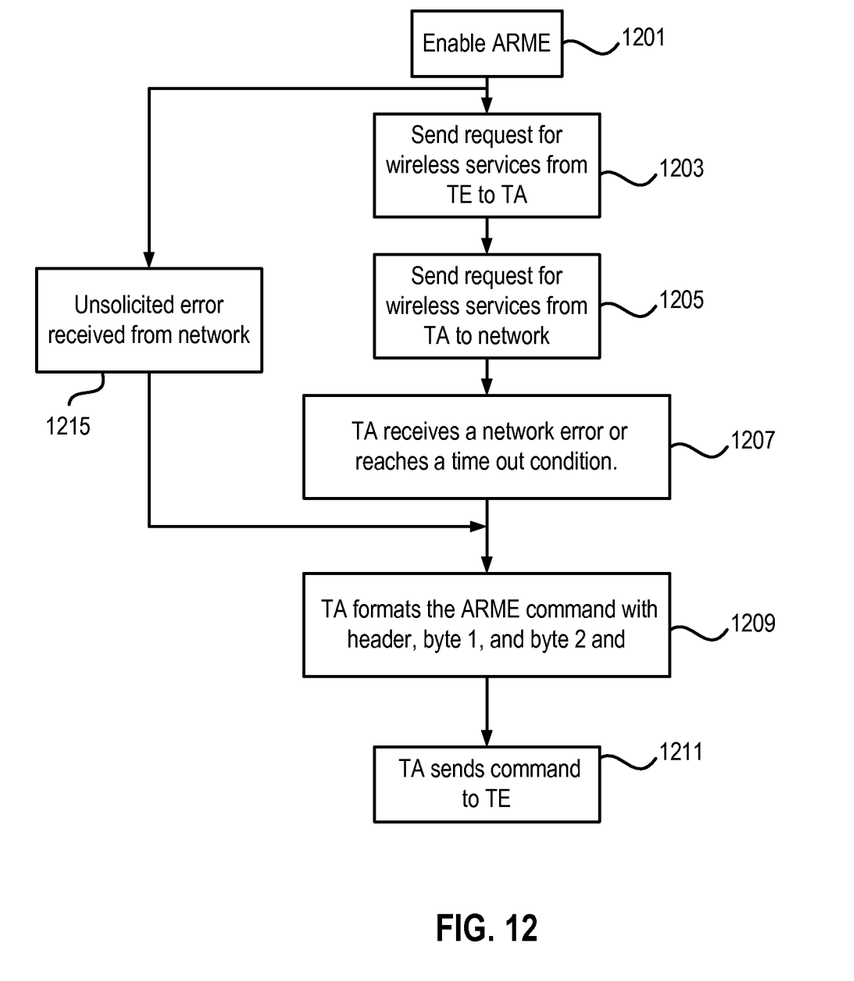
FIG. 12 illustrates an exemplary flow chart according to an embodiment of the invention.

FIG. 12 illustrates a method associated with embodiments described herein. In 1201 the TE sends an enable command to the TA to enable the Agent Reporting Mobile Error (ARME) functionality so that error information can be sent from the TA to the TE when appropriate through the AT interface. Without ARME enabled, when an error occurs, it is not reported to the TE. With ARME enabled, when the TE wants wireless services it sends a request to the TA in 1203. The TA in turn sends a request for wireless services to the network in 1205. Assuming a network error is reported to the TA, or a timeout occurs because the request was ignored by the network, the TA receives the network error in 1207 or reaches a time out condition. In 1209, the TA formats the appropriate header, byte 1, and byte 2, of the ARME command and sends the ARME command with the header, byte 1 and byte 2 to the TE in 1211. The TE can then take appropriate action depending on the nature of the error and the service requested. Also shown in FIG. 12, once enabled, an unsolicited error (not in response to a request for service from the TA) may be received in 1215 and formatted and transmitted to the TE as described for other errors.

As used in this application, the terms "component," "system," "platform," "layer," "selector," "interface," and the like are intended to refer to a computer-related entity Of an entity related to an operational apparatus with one Of more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a processor and the processor can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by through electronic components, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Aspects, features, or advantages of the subject matter can be exploited in a variety of wireless telecommunication technologies, including Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UNITS Terrestrial Radio Access Network (UTRAN); or LTE Advanced.

The description of the invention set forth herein is illustrative, and is not intended to limit the scope of the invention as set forth in the following claims. Other variations and modifications of the embodiments disclosed herein may be made based on the description set forth herein, without departing from the scope and spirit of the invention as set forth in the following claims.

What is claimed is:

1. A method comprising:
   sending a command from a terminal equipment to a terminal adaptor to enable sending error information from the terminal adaptor to the terminal equipment; and
   sending the error information, from the terminal adaptor that accesses a wireless network to the terminal equipment coupled to access the wireless network through the terminal adaptor, in response to existence of any one of a plurality of errors conditions associated with access to the wireless network by the terminal adaptor, wherein the error information includes an error type identifying a domain associated with a respective source of a particular one of the error conditions being reported and an error code providing a reject error cause for the particular one of the error conditions;
   wherein one of the plurality of error conditions includes an unsolicited error received by the terminal adaptor from the wireless network.

2. The method as recited in claim 1 wherein the command is a serial attention (AT) command.

3. The method as recited in claim 1 wherein one of the error conditions includes a request by the terminal adaptor to the wireless network that is ignored by the network.

4. The method as recited in claim 3 wherein the request at is ignored is determined according to a timeout threshold being crossed.

5. The method as recited claim 3 further comprising supplying a specific reject error code identifying that the request from the terminal adaptor that was ignored by the wireless network along with an identification of a network entity that ignored the request command.

6. The method as recited in claim 1 further comprising sending the error information over a wireless communication channel from the terminal adaptor to the terminal equipment.

7. The method as recited in claim 1 further comprising sending the error information of a wired communication channel from the terminal adaptor to the terminal equipment.

8. An apparatus comprising:
   a terminal adaptor including a communication component configured to send error information to a connected entity that accesses a wireless network through the terminal adaptor in response to an error condition existing with respect to communications over the wireless network, the error information being sent in response to existence of any one of a plurality of errors conditions with respect to access to the wireless network, the plurality of error conditions including a request that is ignored by wireless network;
   wherein the error information includes a domain indication in the error information indicative of a network entity associated with the error information;
   wherein the terminal adaptor is responsive to a command from the connected entity that enables sending the error information to the connected entity; and
   wherein one of the plurality of error conditions includes an unsolicited error being received by the terminal adaptor from the wireless network.

9. The apparatus as recited in claim 8 wherein the command is a serial attention (AT) command.

10. The apparatus as recited in claim 8 wherein the request is determined to be ignored according to a timeout threshold being crossed.

11. The apparatus as recited in claim 8 wherein the error information includes an error type identifying the domain that is a source of the error condition and an error code providing a reject error cause.

12. The apparatus as recited in claim 10 further comprising the connected entity connected via a short range wireless connection to the terminal adaptor.

13. An apparatus comprising:
a terminal equipment; and
a terminal adaptor coupled to the terminal equipment, the terminal adaptor including a communication component configured to send error information to the terminal equipment, the terminal equipment configured to access a wireless network through the terminal adaptor, the terminal adaptor configured to send error information to the terminal equipment in response to an error condition existing with respect to communications over the wireless network, the error information being sent in response to existence of any one of a plurality of errors conditions with respect to access to the wireless network, the plurality of error conditions including a request that is ignored by wireless network, wherein the request is determined to be ignored according to a timeout threshold being crossed, an unsolicited error received by the terminal adaptor from the network that is unconnected to a request by the terminal adaptor sent to the wireless network, and a reject by the network in response to a request by the terminal adaptor;
wherein the error information includes a domain indication indicative of a network entity associated with a source of the error information and an error code providing a reject error cause.

* * * * *

UNITED STATES PATENT AND TRADEMARK OFFICE
CERTIFICATE OF CORRECTION

| | | |
|---|---|---|
| PATENT NO. | : 9,058,262 B2 | Page 1 of 1 |
| APPLICATION NO. | : 14/449887 | |
| DATED | : June 16, 2015 | |
| INVENTOR(S) | : Yunpeng Li et al. | |

It is certified that error appears in the above-identified patent and that said Letters Patent is hereby corrected as shown below:

On the title page item (57),

In the Abstract, line 5, please replace "errors" with --error--;

In the claims,

In column 8, In claim 1, line 5, please replace "errors" with --error--;

In column 8, In claim 4, line 1, replace "at" with --that--;

In column 8, In claim 8, line 11, please insert --the-- after "by".

In column 9, In claim 13, line 12, please replace "errors" with --error--.

Signed and Sealed this
First Day of March, 2016

Michelle K. Lee
*Director of the United States Patent and Trademark Office*